(12) United States Patent
Goubert

(10) Patent No.: US 11,346,737 B2
(45) Date of Patent: May 31, 2022

(54) DIFFERENTIAL PRESSURE SENSOR

(71) Applicant: ARIANEGROUP SAS, Paris (FR)

(72) Inventor: François Goubert, Saint Aubin de Medoc (FR)

(73) Assignee: ARIANEGROUP SAS, Paris (FR)

( * ) Notice: Subject to any disclaimer, the term of this patent is extended or adjusted under 35 U.S.C. 154(b) by 164 days.

(21) Appl. No.: 15/733,289

(22) PCT Filed: Dec. 20, 2018

(86) PCT No.: PCT/FR2018/053474
§ 371 (c)(1),
(2) Date: Jun. 21, 2020

(87) PCT Pub. No.: WO2019/122759
PCT Pub. Date: Jun. 27, 2019

(65) Prior Publication Data
US 2021/0116318 A1    Apr. 22, 2021

(30) Foreign Application Priority Data
Dec. 21, 2017 (FR) ...................... 1762717

(51) Int. Cl.
*G01L 13/02* (2006.01)
*G01L 19/04* (2006.01)
*G01L 19/06* (2006.01)

(52) U.S. Cl.
CPC ............ *G01L 13/026* (2013.01); *G01L 19/04* (2013.01); *G01L 19/0618* (2013.01)

(58) Field of Classification Search
CPC ............ G01L 13/00–02; G01L 13/026; G01L 19/00–06; G01L 19/0618; G01L 19/14
See application file for complete search history.

(56) References Cited

U.S. PATENT DOCUMENTS 3,167,963 A * 2/1965 Boonshaft ............. G01L 9/0061
  73/726
4,034,610 A  7/1977 Biddle et al.
(Continued)

FOREIGN PATENT DOCUMENTS

DE     4104811 A1 * 8/1992 ........... G01L 13/026
DE    10131688 A1   7/2002
(Continued)

OTHER PUBLICATIONS

International Search Report issued in corresponding International Application No. PCT/FR2018/053474, dated Apr. 8, 2019 (2 pages).
(Continued)

*Primary Examiner* — Nguyen Q. Ha
(74) *Attorney, Agent, or Firm* — Bookoff McAndrews, PLLC

(57) ABSTRACT

The invention relates to a pressure sensor (10) comprising a cavity (12) containing a liquid, said cavity (12) being closed at a first end by a first diaphragm (20a) and at a second end by a second diaphragm (20b), and a measuring body (30) which comprises a strain gauge (31) positioned inside said cavity (12), characterized in that the measuring body (30) is mechanically connected only to one diaphragm among the first diaphragm (20a) and the second diaphragm (20b) by a connection member (50), the measuring body (30) comprising a shape having central symmetry and the connection member (50) being fastened to the center of symmetry of said measuring body (30).

9 Claims, 2 Drawing Sheets

(56) References Cited

U.S. PATENT DOCUMENTS

| | | | |
|---|---|---|---|
| 4,212,209 A | | 7/1980 | Newbold et al. |
| 4,395,915 A | * | 8/1983 | Singh .................... G01L 13/025 73/706 |
| 4,570,498 A | * | 2/1986 | Okayama .............. G01L 9/0054 73/726 |
| 4,604,900 A | * | 8/1986 | Knudsen ............... G01L 13/025 92/99 |
| 4,787,249 A | * | 11/1988 | Duppui ............... G01L 19/0038 338/4 |

FOREIGN PATENT DOCUMENTS

| | | |
|---|---|---|
| EP | 0327524 A2 | 8/1989 |
| EP | 2251664 A2 | 11/2010 |

OTHER PUBLICATIONS

Pressure sensors, Academie D'aix-Marseille, https://web.archive.org/web/20150926031033/http://www.spc.ac-aix-marseille.fr/phy_chi/Physique_appliquee/Menu/TP/capteur_de_pression/Capteurs_de_pression.html, Sep. 26, 2015 (21 pages).

* cited by examiner

DIFFERENTIAL PRESSURE SENSOR

CROSS-REFERENCE TO RELATED APPLICATION(S)

This patent application is the U.S. National Phase Entry Under 35 U.S.C. § 371 of International Application No. PCT/FR2018/053474, filed on Dec. 20, 2018, which claims the benefit of priority to French Patent Application No. 1762717, filed on Dec. 21, 2017.

BACKGROUND OF THE INVENTION

The present invention relates to the general field of sensors for measuring the pressure of a fluid by measuring the pressure difference between a reference pressure and a pressure to be measured.

Illustrated in FIG. 1 is a pressure sensor 1 of the prior art. The pressure sensor of FIG. 1 is for example described on the Internet at the address: "http://www.spc.ac-aix-marseille.fr/phy_chi/Physique_appliquee/Menu/TP/capteur_de_ pression/Capteurs_de_pression.html." As is visible in FIG. 1, the pressure sensor 1 comprises two fluid inlet lines $2a$, $2b$. One of the two inlet lines $2a$, $2b$ corresponds to the reference line by which a fluid with a reference pressure which is known is introduced into the pressure sensor 1, and the other line corresponds to the measuring line by which a fluid with a pressure to be measured is introduced into said pressure sensor 1.

The pressure sensor 1 is a bidirectional sensor, making possible the case where the inlet line $2a$ is the reference line while the inlet line $2b$ is the measuring line, as well as the case where the inlet line $2a$ is the measuring line while the inlet line $2b$ is the reference line.

In order to measure the pressure difference between the two inlet lines $2a$, $2b$, the pressure sensor 1 comprises a measuring bar 3 on which the pressure of the two inlet lines $2a$, $2b$ is exerted. The measuring bar 3 is fastened by one end, the other end being free to move. A strain gauge $3a$ is positioned on the measuring bar 3 so as to measure the deformation of said measuring bar 3 and thus obtain the pressure difference between the two inlet lines $2a$, $2b$ from the deformation of the measuring bar 3.

The pressure sensor 1 comprises diaphragms $4a$, $4b$ which are located facing each inlet line $2a$, $2b$. The diaphragms $4a$, $4b$ are intended to each be subjected to the pressure of the fluid of one of the inlet lines $2a$, $2b$ and to transmit this pressure to the measuring bar 3 each by a transmitting bar $5a$, $5b$. The cavity 6 defined by the space between the diaphragms $4a$, $4b$ is filled with oil in order to limit the variation of volume of said cavity 6.

The pressure sensor of the prior art sometimes encounters a problem of sensitivity to temperature, the measurement of the pressure sensor evolving nonlinearly as a function of temperature. This sensitivity to temperature arises from the thermal dilation of the oil inside the cavity 6. Such nonlinear sensitivity to temperature tends to reduce the range of temperatures in which the pressure sensor can carry out accurate measurement, because the greater the range of operating temperatures of the sensor, the more difficult it is to compensate the sensitivity of the sensor to temperature.

In addition, the pressure sensor of the prior art has linear sensitivity to the reference pressure and thus, for the same pressure difference between the reference pressure and the pressure to be measured, the measurement of the pressure sensor 1 varies linearly as a function of the reference pressure. This sensitivity to the reference pressure arises from the compressibility of the oil inside the cavity 6. Thus, in order to increase the accuracy of the pressure sensor, it is necessary to compensate the measurement as a function of the value of the reference pressure, which complicates the pressure sensor.

Finally, the pressure sensor of the prior art also encounters a problem of resistance to overpressure that is too limited. In fact, in order to limit the movement of the transmitting bars $5a$, $5b$ and the bending off the measuring bar 3, said transmitting bars $5a$, $5b$ have stops $7a$, $7b$. However, the diaphragm $4a$, $4b$ located on the side opposite the line on which the overpressure occurs tends to deform by bulging toward the outside of the cavity 6 under the influence of the movement of oil within said cavity 6, which can cause damage to said diaphragm $4a$, $4b$.

OBJECT AND SUMMARY OF THE INVENTION

The present invention therefore has as its main goal to palliate such disadvantages by proposing a pressure sensor comprising a cavity containing a liquid, said cavity being closed at a first end by a first diaphragm and at a second end by a second diaphragm, and a measuring body which comprises a strain gauge positioned inside said cavity, characterized in that the measuring body is mechanically connected only to one diaphragm among the first diaphragm and the second diaphragm by a connection member, the measuring body comprising a shape having central symmetry and the connection member being fastened to the center of symmetry of the central symmetry of said measuring body.

The pressure sensor can also comprise the following features, taken alone or in combination according to technical possibilities:

the cavity comprises a first chamber positioned on the side of the first diaphragm, and a second chamber positioned on the side of the second diaphragm, said sensor comprising an overpressure safety device configured to prevent the circulation of liquid between the first chamber and the second chamber when a pressure difference between a first pressure exerted on the first diaphragm and a second pressure exerted on the second diaphragm exceeds a threshold value;

the overpressure safety device comprises, on the one hand, a first overpressure valve configured to prevent the circulation of liquid between the first chamber and the second chamber when the difference, first pressure minus second pressure, reaches a first limiting value, and on the other hand a second overpressure valve configured to prevent the circulation of liquid between the first chamber and the second chamber when the difference, second pressure minus first pressure, reaches a second limiting value;

the connection member comprises a first end in contact with the first diaphragm, the first end of said connection member comprising a diameter greater than the rest of said connection member;

the cavity is separated into a first chamber positioned on the side of the first diaphragm and a second chamber positioned on the side of the second diaphragm, the first and second chambers being separated by the measuring body, the measuring body comprising bores for the circulation of liquid between the first chamber and the second chamber;

the measuring body is a disk, the contour of which is fastened to an inner wall of the cavity of the pressure sensor, the connection member being fastened to the center of said disk;

the measuring body is a plate with a square cross section, the contour of which is fastened to an inner wall of the cavity of the pressure sensor, the connection member being fastened to the center of said plate;

the measuring body is a bar the two ends of which are fastened to an inner wall of the cavity of the pressure sensor, the connection member being fastened to the center of said bar;

the liquid is oil.

BRIEF DESCRIPTION OF THE DRAWINGS

Other features and advantages of the present invention will be revealed by the description made below, with reference to the appended drawings which illustrate an exemplary embodiment of it lacking any limiting character. In the figures.

DETAILED DESCRIPTION OF THE INVENTION

Figure 1:
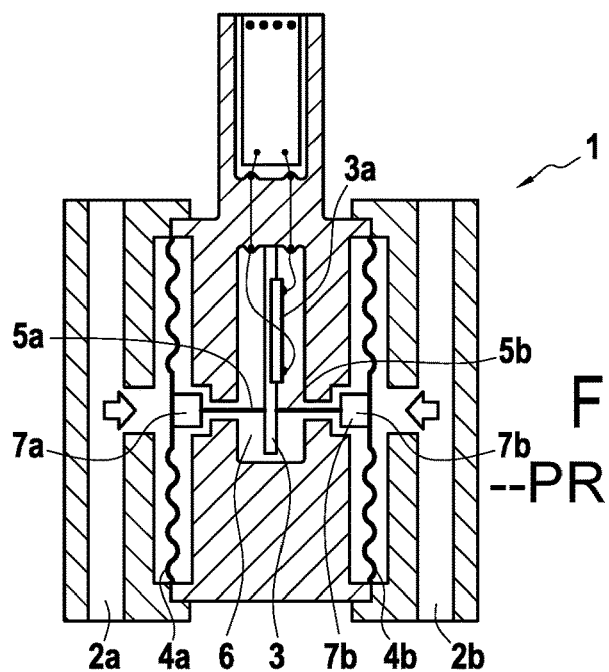
FIG. 1 illustrates a differential pressure sensor of the prior art.
Figure 2A:
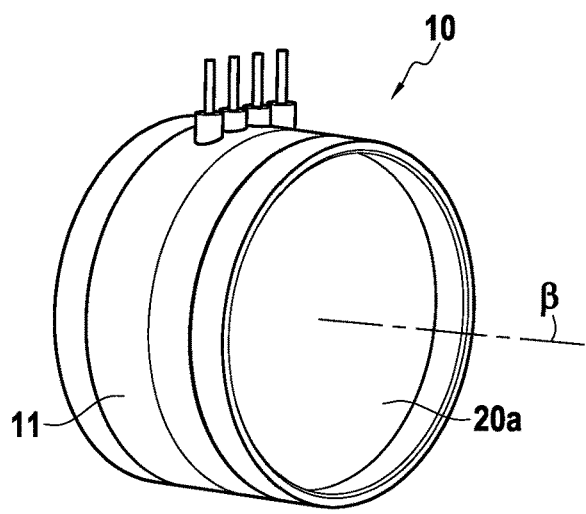
FIGS. 2a and 2b illustrate a differential pressure sensor according to one embodiment of the invention.
Figure 2B:
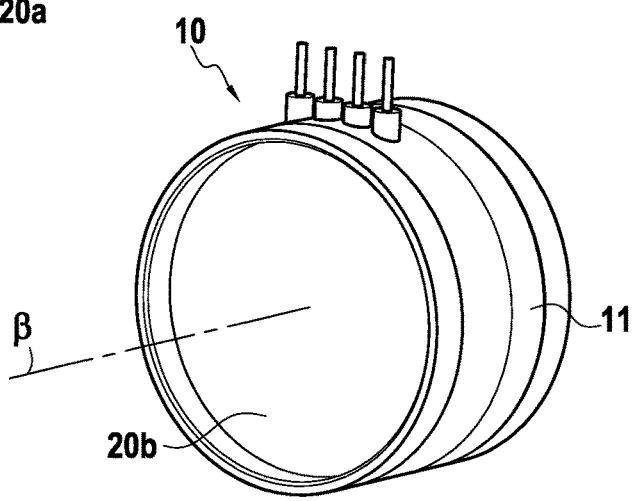
Figure 3:
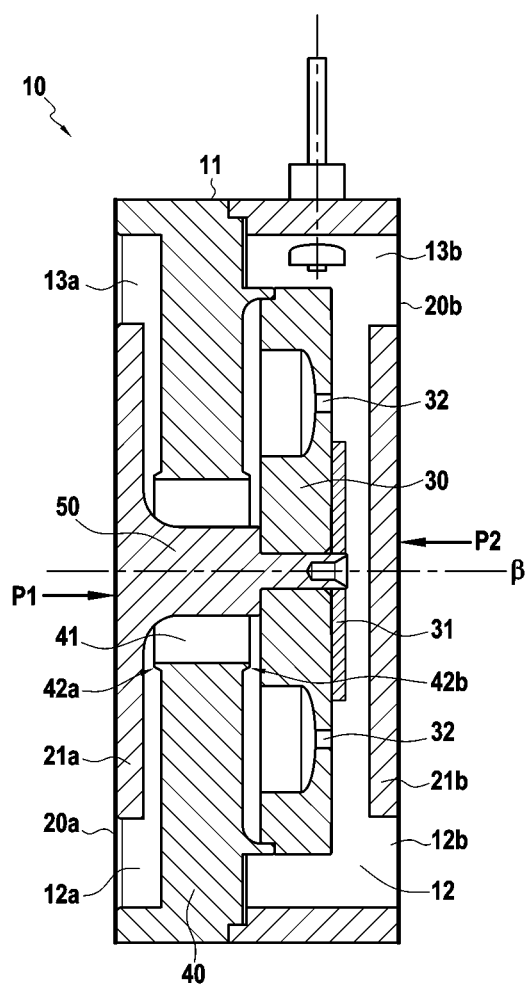
FIG. 3 illustrates a section view of a differential pressure sensor according to one embodiment of the invention.

As illustrated in FIGS. 2a, 2b and 3, a pressure sensor 10 according to the invention comprises a cylindrical wall 11 directed along an axis β which delimits a cavity 12, said cavity 12 being filled with a liquid. Preferably, the liquid filling the cavity 12 of the pressure sensor 10 is oil, oil being slightly compressible.

The cavity 12 comprises a first end 12a which is closed by a first diaphragm 20a, and a second end 12b which is closed by a second diaphragm 20b. The first diaphragm 20a and the second diaphragm 20b are intended to be installed, one on a reference line and the other on a measuring line. The reference line is a line comprising a fluid, the pressure of which is known, so as to be able to calculate the pressure of the fluid of the measuring line thanks to the measurement by the pressure sensor 10 of the pressure difference between the reference line and the measuring line.

The pressure sensor 10 comprises a measuring body 30 positioned in the cavity 12, between the first diaphragm 12a and the second diaphragm 12b. The measuring body 30 comprises a strain gauge 31 installed on said measuring body 30, and which is configured to measure the deformation of said measuring body 30.

The measuring body 30 comprises a shape having central symmetry. The measuring body therefore comprises a center of symmetry. The center of symmetry of the measuring body is preferably positioned on the axis β.

In order to fasten the measuring body 30 inside the cavity 12, the inner wall of the cavity 13 comprises a fastening bracket 40 which, on the one hand, is fastened to the wall 11 of the pressure sensor 10 and to which, on the other hand, is fastened to the measuring body 30. The shape of the fastening bracket 40 and the fastening to the measuring body 30 are designed so that said measuring body 30 can deform by bending, hence the fastening points between the fastening bracket 40 and the measuring body 30 are spaced from said fastening bracket 40.

In the exemplary embodiment illustrated in FIGS. 2a, 2b and 3, the measuring body 30 is a disk centered on the axis β, the center of symmetry of said measuring body 30 therefore being located at the center of the disk, on the axis β. The fastening bracket 40 is also a disk which comprises a circular rib which engages a complementary circular groove formed on the contour of the measuring body 30, thus ensuring fastening of said measuring body 30 to the fastening bracket 40.

The pressure sensor 10 comprises a connection member 50, for example a pin, which mechanically connects the center of symmetry of the measuring body 30 to one diaphragm among the first diaphragm 20a and the second diaphragm 20b. In the example illustrated in FIGS. 2a, 2b and 3, the connection member 50 connects the measuring body 30 to the first diaphragm 20a. The connection member 50 therefore comprises a first end in contact with the first diaphragm and one end in contact with the center of symmetry of the measuring body 30. The second end of the connection member 50 is fastened to the measuring body 30 so that the measuring body 30 accurately follows all the movements of the connection member 50.

The other diaphragm, here the second diaphragm 20b, is not connected mechanically to the measuring body 30, unlike the prior art sensor. By "mechanical connection" is meant here that the forces applied to the diaphragm are transmitted to the measuring body 30 via a part, such as for example a bar, the part also transmitting the forces of the measuring body to the diaphragm.

The pressure sensor 10 measures a pressure difference between a first pressure P1 applied to the first diaphragm 20a and a second pressure P2 applied to the second diaphragm 20b due to the fact that the second pressure P2 applied to the second diaphragm 20b is transferred to the first diaphragm 20a via a liquid filling the pressure sensor 10, so that the force applied to the measuring body 30 by the first diaphragm 20a via the connection member 50 corresponds to the difference between the first pressure P1 and the second pressure P2. The measurement of the deformation of the measuring body 30 by the strain gauge 31 allows measuring the force applied to said measuring body 30 by the first diaphragm 20a, and thus obtaining the pressure difference between the reference line and the measuring line.

The fact that the measuring body 30 has a shape with central symmetry and is connected mechanically only to the first diaphragm 20a at its center of symmetry allows resolving the problem of sensitivity of the pressure sensor 10 to temperature. In fact, the thermal dilation of the liquid filling the pressure sensor 10 is now compensated by bulging of the second diaphragm 20b, such bulging having been made possible by the fact that said second diaphragm 20b is not connected mechanically to the measuring body 30. In addition, this also allows resolving the problem of sensitivity of the pressure sensor 10 to the reference pressure. Moreover, the fact that the measuring body 30 has a shape with central symmetry and is connected mechanically only to the first diaphragm 20a at its center of symmetry allow improving the bidirectional character of the pressure sensor 10. By bidirectional is meant here the ability of the pressure sensor 10 to give the same measurement for a pressure to be measured applied to the first diaphragm 20a or to the second diaphragm 20b.

As is visible in 3, the cavity 12 of the pressure sensor 10 is divided into two chambers by the measuring body 30 and the fastening bracket 40, a first chamber 13a positioned on the side of the first diaphragm 20a and a second chamber 13b positioned on the side of the second diaphragm 20b. The fastening bracket 40 comprises a bore 41 to allow the connection member 50 to pass, and to allow the fluid to circulate between the first chamber 13a and the second chamber 13b. The measuring body 30 also comprises bores 32 in order to allow the fluid to circulate between the first chamber 13a and the second chamber 13b. Thus, any movement of the first diaphragm 20a or of the second diaphragm 2b causes a liquid movement between the first chamber 13a and the second chamber 13b.

The pressure sensor 10 comprises an overpressure safety device which is movable between an open position in which the liquid can freely move between the first chamber 13a and the second chamber 13b, and a closed position in which said overpressure safety device prevents the circulation of fluid between the first chamber 13a and the second chamber 13b. The overpressure safety device is configured to be in the open position during normal use, and to switch into the closed position in the event of overpressure in one of the lines. Thus, when the pressure exerted on a diaphragm becomes too great relative to the pressure exerted on the other diaphragm and the difference between the two pressures reaches a threshold value, the overpressure safety device switches into the closed position. An overpressure safety device of this type allows preventing the liquid located in the chamber corresponding to the diaphragm undergoing the overpressure from being driven into the other chamber and deforming the other diaphragm by making it bulge outward, thus risking causing damage.

In the exemplary embodiment illustrated in FIG. 3, the overpressure safety device is formed by a first overpressure valve 42a and a second overpressure valve 42b. The first overpressure valve 42a is formed on a first face of the fastening bracket 40 directed toward the first diaphragm 20a, and the second overpressure valve 42b is formed on a second face of the fastening bracket directed toward the second diaphragm 20b and the measuring body 30. The first valve 42a and the second valve 42b are both movable between an open position in which they allow the circulation of liquid between the first chamber 13a and the second chamber 13b, and a closed position in which they prevent the circulation of liquid between the two chambers.

The first overpressure valve 42a switches into its closed position when the first pressure P1 becomes too great as a result of an overpressure, and that thus the pressure difference ΔP first pressure P1 minus second pressure P2 (ΔP=P1−P2) reaches a first limiting value. The first overpressure valve 42a switches into its closed position by crushing of the first diaphragm 20a under the influence of the increase in the first pressure P1, a disk 21a positioned below the diaphragm (formed here by one end of the connection member 50) blocking the first overpressure valve 42a. The first limiting value is determined by the separation between the first face of the fastening bracket 40 and the disk 21a positioned below the first diaphragm 20a.

The second overpressure valve 42b switches into its closed position when the second pressure P2 becomes too great as a result of an overpressure and that thus the pressure difference ΔP second pressure P2 minus first pressure P1 (ΔP=P2−P1) reaches a second limiting value. The second overpressure valve 42b switches into its closed position by crushing of the measuring body 30 against the second face of the fastening bracket 40. The deformation of the measuring body 30 is caused by the increase in the pressure of the liquid in the second chamber 13b. The second limiting value is determined by the separation between the measuring body 30 and the second face of the fastening bracket 40.

In the exemplary embodiment illustrated in the figures, disks 21a and 21b are installed against the first and second diaphragms 20a and 20b. These disks 21a, 21b allow the diaphragms to be reinforced. The disk 21a positioned below the first diaphragm 20a can be formed by an enlargement of the diameter of the connection member 50 at its first end.

According to one possible variant, the pressure sensor 10 can be lacking a disk 21b against the second diaphragm 20b.

According to one possible variant, the measuring body 30 is a plate with a square cross section (section perpendicular to the axis β), which is fastened over its entire contour to the fastening bracket 40 and which is fastened to the connection member 50 at its center. According to another possible variant, the measuring body 30 is a bar which is fastened at its two ends to the fastening bracket 40, and which is fastened to the connection member 50 at its center.

The invention claimed is:

1. A pressure sensor comprising a cavity containing a liquid, said cavity being closed at a first end by a first diaphragm and at a second end by a second diaphragm, and a measuring body which comprises a strain gauge positioned inside said cavity, characterized in that the measuring body is mechanically connected only to one diaphragm among the first diaphragm and the second diaphragm by a connection member, the measuring body comprising a shape having central symmetry and the connection member being fastened to the center of symmetry of the central symmetry of said measuring body.

2. The pressure sensor according to claim 1, wherein the cavity comprises a first chamber positioned on the side of the first diaphragm, and a second chamber positioned on the side of the second diaphragm, said pressure sensor comprising an overpressure safety device configured to prevent the circulation of liquid between the first chamber and the second chamber when a pressure difference between a first pressure exerted on the first diaphragm and a second pressure exerted on the second diaphragm exceeds a threshold value.

3. The pressure sensor according to claim 2, wherein the overpressure safety device comprises, on the one hand, a first overpressure valve-configured to prevent the circulation of liquid between the first chamber and the second chamber when the difference, first pressure minus second pressure reaches a first limiting value, and on the other hand a second overpressure valve configured to prevent the circulation of liquid between the first chamber and the second chamber when the difference, second pressure minus first pressure reaches a second limiting value.

4. The pressure sensor according to claim 1, wherein the connection member comprises a first end in contact with the first diaphragm, the first end of said connection member comprising a diameter greater than the rest of said connection member.

5. The pressure sensor according to claim 1, wherein the cavity is separated into a first chamber positioned on the side of the first diaphragm and a second chamber positioned on the side of the second diaphragm, the first chamber and the second chamber-being separated by a measuring body, the measuring body comprising bores for the circulation of liquid between the first chamber and the second chamber.

6. The pressure sensor according to claim 1, wherein the measuring body is a disk, the contour of which is fastened to an inner wall of the cavity of the pressure sensor, the connection member being fastened to the center of said disk.

7. The pressure sensor according to claim 1, wherein the measuring body is a plate with a square cross section, the contour of which is fastened to an inner wall of the cavity of the pressure sensor, the connection member being fastened to said plate.

8. The pressure sensor according to claim 1, wherein the measuring body is a bar, the two ends of which are fastened to an inner wall of the cavity of the pressure sensor, the connection member being fastened to the center of said bar.

9. The pressure sensor according to claim 1, wherein the liquid is oil.

\* \* \* \* \*